United States Patent [19]

Yerushalmy

[11] 4,311,897

[45] Jan. 19, 1982

[54] PLASMA ARC TORCH AND NOZZLE ASSEMBLY

[75] Inventor: Yosef Yerushalmy, Florence, S.C.

[73] Assignee: Union Carbide Corporation, New York, N.Y.

[21] Appl. No.: 170,040

[22] Filed: Jul. 18, 1980

Related U.S. Application Data

[63] Continuation-in-part of Ser. No. 70,526, Aug. 28, 1979, abandoned.

[51] Int. Cl.[3] .......... B23K 9/00

[52] U.S. Cl. .......... 219/121 PP; 219/121 PM; 219/121 PC; 219/121 PQ

[58] Field of Search ...... 219/76.16, 121 PM, 121 PN, 219/121 PP, 121 PQ, 121 PR, 121 P, 121 PJ; 313/231.4, 231.5

[56] References Cited

U.S. PATENT DOCUMENTS

| | | | |
|---|---|---|---|
| 2,906,858 | 9/1959 | Morton, Jr. | 219/121 PP |
| 3,534,388 | 10/1970 | Ito et al. | 219/121 PP |
| 3,619,549 | 11/1971 | Hogan | 219/121 PP |
| 3,641,308 | 2/1972 | Couch, Jr. et al. | 219/121 PP |
| 3,825,718 | 7/1974 | Mosiashvili et al. | 219/121 PP |

FOREIGN PATENT DOCUMENTS

| | | | |
|---|---|---|---|
| 2513098 | 9/1976 | Fed. Rep. of Germany | 219/121 P |
| 2525939 | 12/1976 | Fed. Rep. of Germany | 219/121 P |
| 250339 | 8/1977 | U.S.S.R. | 219/121 P |

*Primary Examiner*—Gerald P. Tolin
*Assistant Examiner*—Mark H. Paschall
*Attorney, Agent, or Firm*—Eugene Lieberstein

[57] ABSTRACT

In combination, a plasma arc torch having an electrode structure adapted to be connected to a power supply for establishing a transferred plasma arc between the electrode structure and a workpiece and a nozzle assembly for constricting the plasma arc wherein the nozzle assembly comprises a first and second arc constricting passageway separated by a water chamber with the length of each passageway and the length of the water chamber being defined by a predetermined relationship to optimize the cutting speed and to minimize sensitivity to torch stand off.

9 Claims, 4 Drawing Figures

PLASMA ARC TORCH AND NOZZLE ASSEMBLY

This is a continuation-in-part of U.S. application Ser. No. 70,526 filed Aug. 28, 1979 and now abandoned.

This invention relates to plasma arc torches and to an improved nozzle assembly for a plasma arc torch for operating in the transferred arc mode, i.e., with the torch electrode connected in circuit with the workpiece.

The transferred arc mode of operation permits the cutting of thick metal workpieces of up to about 6 inches in thickness using a plasma arc torch. By connecting the electrode in circuit with the workpiece current is transferred from the plasma arc into the workpiece thereby providing the necessary energy to penetrate thick metal.

A plasma arc is developed by passing the arc through an arc constricting passageway formed in a nozzle located between the electrode and workpiece. It is conventional to surround the arc with a swirling vortex of gas and thereafter to envelop the surrounding gas using a liquid jet preferably in the form of a swirling liquid vortex. The liquid vortex should preferably be directed in the same flow direction as that of the gas. The structure of the nozzle is designed to permit the introduction of the liquid jet, preferably water, downstream of the arc constricting passageway. To accomplish this, a two component nozzle assembly is used having a main nozzle body placed adjacent to the torch electrode and a lower base member spaced apart from the main body to form a liquid chamber therebetween. The main body and the base member each have a common coaxial orifice defining the arc constricting passageway. A liquid is passed into the liquid chamber which flows through the passageway in the lower base member surrounding both the arc and gas. The flow of liquid reduces the tendency of double arcing and when the liquid is swirled in the same direction as the high gas, quality cuts are obtained with relative ease. The latter technique is disclosed in U.S. Pat. No. 3,619,549, the disclosure of which is herein incorporated by reference.

It has been discovered in accordance with the present invention that the length of the passageway in the upper base member of the nozzle assembly relative to the combined length of the lower base member and the length of the liquid chamber separating the upper and lower passageways controls the overall cutting quality and the dross free cutting speed range. It has further been discovered that the length of the lower base member of the nozzle assembly is a primary factor in controlling the degree of sensitivity to variations in "torch standoff" and the cutting speed of the torch. "Torch standoff" represents the distance separating the end of the torch and the workpiece. For any given set of operating conditions there is an optimum torch standoff. Heretofore performance of the plasma arc torch was highly sensitive to variations in the torch standoff. A variation in torch standoff greater than about 1.5 mm would result in poor cutting performance and produce significant dross. Applicant has discovered that, by maintaining a predetermined dimensional relationship between the arc constricting passageways and the liquid chamber, the sensitivity to variations in torch standoff may be minimized, cutting speed maximized and the range of dross free cutting speed widened. It has also been discovered that the life of the nozzle can be increased by maintaining a predetermined ratio between the passageway diameters. Apparently, in the transferred arc mode of operation, the lower arc passageway acts to induce a secondary arc constriction which affects the formation of the primary arc constriction in the main body passageway to form a resultant plasma arc which may be controlled by varying the relative dimensions between the two nozzle components.

Accordingly, the main object of the present invention is to provide a plasma arc torch and nozzle assembly for transferred arc operation which is insensitive to variations in the torch to work standoff over an extended distance.

It is a further object of the present invention to provide a plasma arc torch which will be substantially insensitive to variations in torch standoff and is capable of operating at substantially increased cutting speed and a wider range of dross free cutting speeds.

It is an even further object of the present invention to provide a plasma arc torch with increased cutting nozzle life.

These and other objects and advantages of the present invention will become apparent from the following detailed description of the invention when read in conjunction with the accompanying drawings of which:

Figure 1:
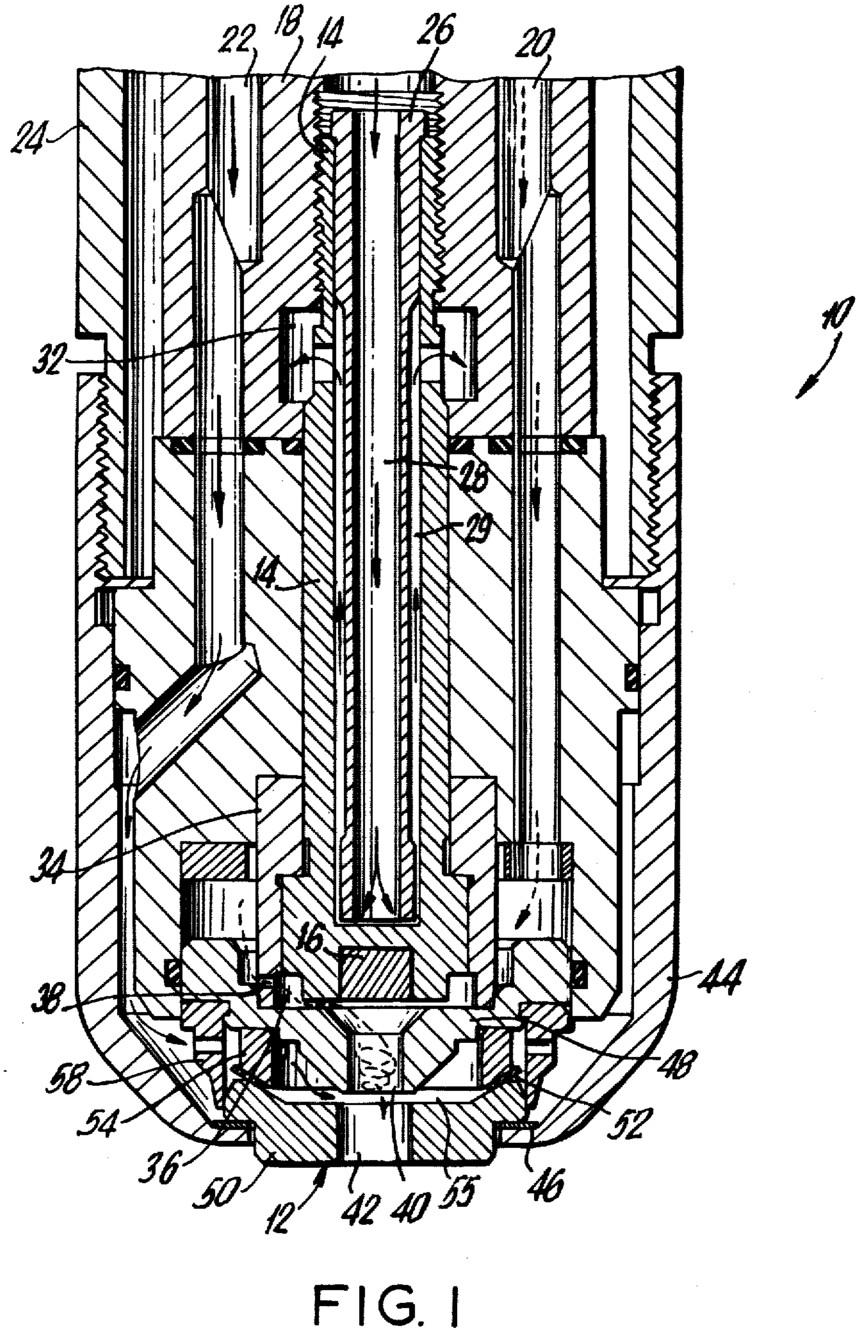
FIG. 1 is a side elevation of the plasma arc torch of the present invention.
Figure 2:
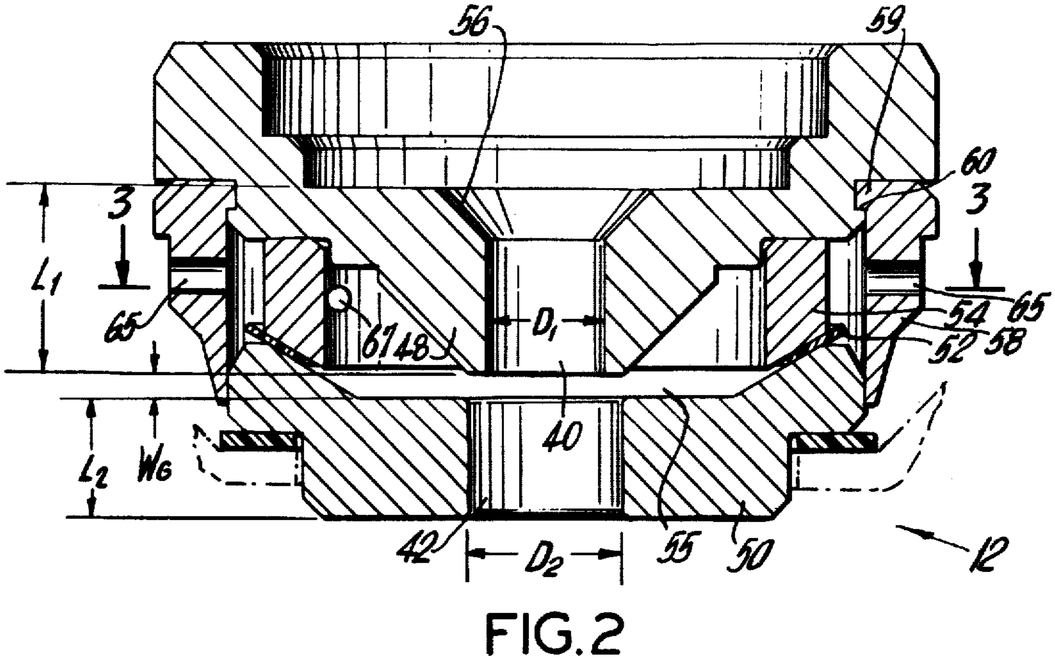
FIG. 2 is an enlarged side elevation of the nozzle assembly of FIG. 1.

Referring now to FIG. 1 in which is shown the detailed construction of a plasma arc torch 10 in combination with the preferred nozzle assembly 12 of the present invention. FIG. 2 is an enlarged drawing of the nozzle assembly 12 of FIG. 1. The torch 10 includes a nonconsumable electrode structure 14 preferably of copper having a tungsten or thoriated tungsten insert 16 which serves as the cathode terminal. The electrode structure 14 is connected to a torch body 18 having gas and liquid passageway 20 and 22 respectively. The torch body is surrounded by an outer insulated housing member 24.

A tube 26 is suspended with the central bore 28 of the electrode structure 14 for circulating a liquid medium such as water through the electrode structure 14. The tube 26 is of a diameter smaller than the diameter of the bore 28 so as to provide a space 29 for the water to flow upon discharge from the tube 26. The water flows from a source (not shown) through the tube 26 and back through the space 29 past the opening 32 in the torch body 18 and into passageway 22. The passageway 22 directs the cooling water into the nozzle assembly 12 where it is converted into a swirling vortex for surrounding the plasma arc as will be explained in more detail hereafter. The gas passageway 20 directs gas, from a suitable source not shown, through a conventional gas baffle 34 of any suitable high temperature ceramic material, into a gas plenum chamber 36 via inlet holes 38. The inlet holes 38 are arranged to cause the gas to enter the plenum chamber 36 in a swirling fashion as is well-known. The gas flows out from the plenum chamber 36 through the arc constricting passageway 40 and 42 of the nozzle assembly 12. The electrode structure 14 upon being connected to the torch body 18 holds in place the ceramic gas baffle 34 and a high temperature plastic insulating member 35. The member 35 electrically insulates the nozzle assembly 12 from the electrode structure 14.

The nozzle assembly 12 is supported by a nozzle cup 44 which is detachably engaged to the outer housing member 24 of the torch head. The nozzle assembly 12 comprises an upper main body 48 and a lower member 50. Although the lower member may be metal, a ceramic material such as alumina is preferred. The lower member 50 is separated from the upper main body 48 by a plastic spacer element 52 and a swirl ring 54. The space provided between the upper main body 48 and the lower member 50 forms a water chamber 55. The upper main body 48 has an arc constricting passageway 40 in axial alignment with the longitudinal axis of the torch electrode structure 14. The arc constricting passageway 40 is of cylindrical geometry having a chamfered end 56 adjacent the plenum chamber 36 with a chamfer angle of preferably 45°.

Figure 3:
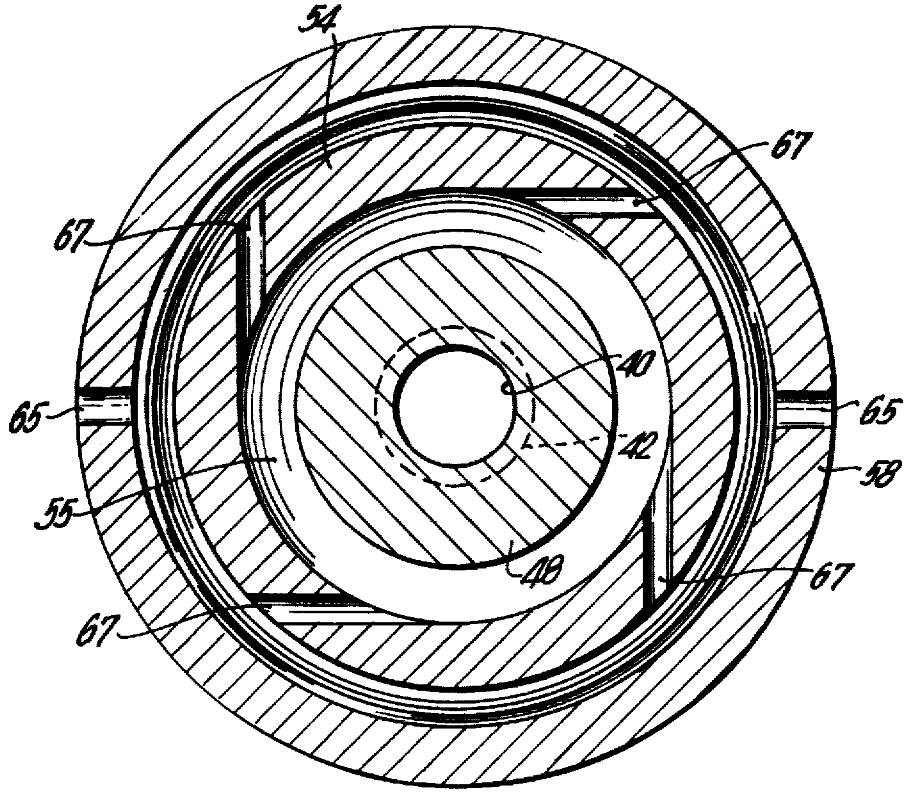
FIG. 3 is a cross-sectional view of the nozzle assembly taken along the lines 3—3 of FIG. 2.
Figure 4:
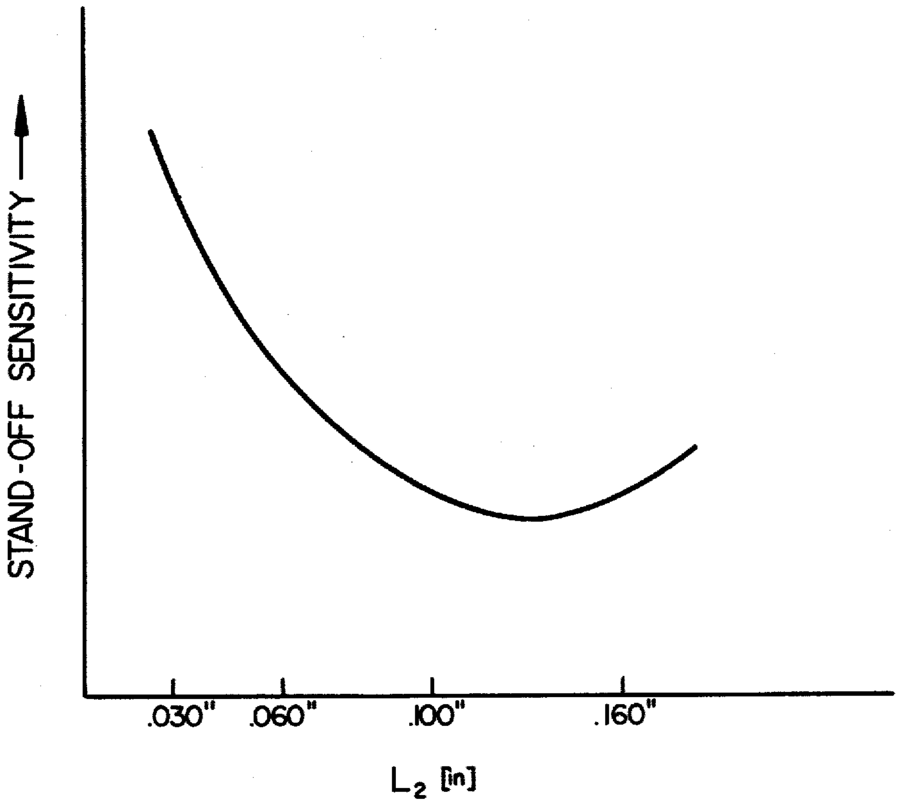
FIG. 4 is a graph illustrating the performance of the torch of FIG. 1 in terms of the torch standoff sensitivity relative to the length of the lower base passageway.

The arc constricting passageway 42 is a cylindrical bore formed in the lower member 50 and maintained in axial alignment with the arc constricting passageway 40 in the upper member 48 by a centering sleeve 58 of any suitable plastic material. The centering sleeve 58 has a lip 59 at one end thereof which is detachably locked into a notch 60 in the upper body 48. The centering sleeve 58 extends from the upper body in biased engagement against the lower member 50. The swirl ring 54 and spacer element 52 are assembled prior to insertion of the lower member 50 into the sleeve 58. The water flows from the passageway 22 through an opening 65 to the injection ports 67 which inject the water into the water chamber 55. The injection ports 67 are tangentially disposed around the swirl ring 54 as shown in FIG. 3 to cause the water to form a vortical pattern in the water chamber 55. The water exits the water chamber 55 through the arc constricting passageway 42 in the lower member 50.

A power supply (not shown) is connected to the torch electrode structure 14 in a series circuit relationship with a metal workpiece which is typically grounded. A plasma arc is established between the cathode terminal 16 of the torch 10 and the workpiece. The plasma arc is formed in a conventional manner by momentarily establishing a pilot arc between the electrode structure 14 and the nozzle 12 which is then tranferred to the workpiece through the arc constricting passageways 40 and 42 respectively. Each arc constricting passageway 40 and 42 contributes to the intensification and collimation of the arc. The swirling vortex of water is preferred for optimum performance.

An interrelation has been found to exist between the dimensions of the arc constricting passageways 40 and 42 and the length of the water gap Wg in the water chamber 55. More specifically, the length $L_1$ of the upper passageway 40 in FIG. 2 is related to the combined length $L_2$ of the lower passageway 42, and the length of the water gap Wg separating the upper and lower passageways, respectively. This relationship can be mathematically defined as follows:

$L_1 = K\,(Wg + L_2)$ where K is a multiplying constant. Overall cut quality is maximized with minimum stand off sensitivity when K is greater than one and less than about four. The optimum conditions exists when K is between 2–3.

For purposes of the present invention, the diameter $D_2$ of the lower arc constricting passageway 42 must be essentially constant throughout its length $L_2$. For such a torch construction, the length of the lower passageway $L_2$ has been found to be the most significant factor in controlling standoff sensitivity as substantiated by FIG. 5 requiring a relatively thick lower member 50. The optimum range for the length of the lower passageway $L_2$ lies between 0.07–0.16 inches. Within this range torch standoff sensitivity is minimized. Using a preferred water gap Wg range of between 0.10 and 0.20 inches leaves an optimum range for $L_1$ of between 0.16 to 0.36 inches.

The following examples illustrate the advantage of the present invention over the prior art using a lower passageway length $L_2$ in the preferred range and K between 1 and 4. In each of the following examples the water rate is 0.38 gpm and the plasma flow rate is 140 cfh.

EXAMPLE 1

Faster cutting speed.
1" carbon steel plate.
400 amperes
Maximum prior cutting speed—30 ipm
Present cutting speed—50 ipm

EXAMPLE 2

Wider range of dross-free cutting speeds.
½" carbon steel plate.
350 amperes
Prior range—between 90–93 ipm
Present range—between 85–115 ipm

EXAMPLE 3

Longer and less-sensitive stand-off
Using the 0.156" nozzle
(275–400 amperes)
Prior stand-off—¼±1/16
Present stand-off—⅜±⅛

It has further been found that the life of the nozzle assembly 12 may be increased by maintaining the diameter $D_2$ of the lower arc constricting passsageway 42 in a range of between 8 to 20" greater than the diameter $D_1$ of the upper arc constricting passageway 40. The optimum relationship is for diameter $D_2$ to be about 10–15% greater than $D_1$ with 12% being preferred.

What is claimed is:

1. In combination, a plasma torch having a nonconsumable electrode adapted to be connected in circuit with a power supply and workpiece for establishing a transferred plasma arc between the nonconsumable electrode and the workpiece through a nozzle assembly arranged beneath said electrode relative to said workpiece and means for passing a swirling flow of gas around said arc and through said nozzle assembly thereby forming a constricted plasma arc of high current density; said nozzle assembly comprising:

a first arc constricting passageway having a longitudinal axis in alignment with the longitudinal axis of said nonconsumable electrode;

a second arc constricting passageway in coaxial alignment with said first arc constricting passageway, said second arc constricting passageway having an essentially constant diameter throughout its length;

a water chamber separating said first and second arc constricting passageways; and means for introducing a jet of liquid into said water chamber for enveloping said swirling gas and arc within said second arc constricting passageway; wherein said first and second arc constricting passageways are each of a predetermined length in a predetermined relationship to one another and to the length of the water chamber separating said passageways defined as follows:

$$L_1=K(L_2+Wg)$$

where K is a multiplying constant which must be greater than one and less than about four, and wherein $L_1$ is equal to the length of said first arc constricting passageway;

$L_2$ is equal to the length of said second arc constricting passageway; and

Wg is equal to the length of said water chamber separating said first and second passageways.

2. The combination as defined in claim 1 wherein K is between 2 and 3.

3. The combination as defined in claim 2 wherein $L_2$ lies between 0.07–0.16 inches.

4. The combination as defined in claim 3 wherein $L_1$ lies between 0.16 to 0.36 inches.

5. The combination as defined in claim 4 wherein the diameter of said second passageway is between about 8 to about 20 percent larger than the diameter of said first arc constricting passageway.

6. The combination as defined in claim 5 wherein the diameter of said second passageway is about 12% greater than the diameter of the first arc constricting passageway.

7. The combination as defined in claim 6 wherein said means for introducing said liquid jet comprises a swirl ring having a plurality of orifices tangentially disposed around said water chamber to cause said liquid jet to form a swirling vortex.

8. The combination as defined in claim 5 wherein said first passageway has a chamfered end adjacent said electrode structure.

9. The combination as defined in claim 6 wherein said chamfered end forms a chamfered angle of about 45 degrees.

* * * * *